June 11, 1935.   O. C. SCHMIDT   2,004,618
PRESS HEAD FOR STUFFING MACHINES
Filed July 29, 1933
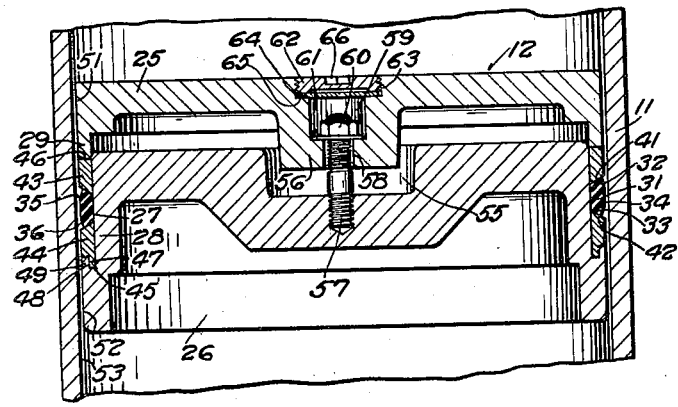
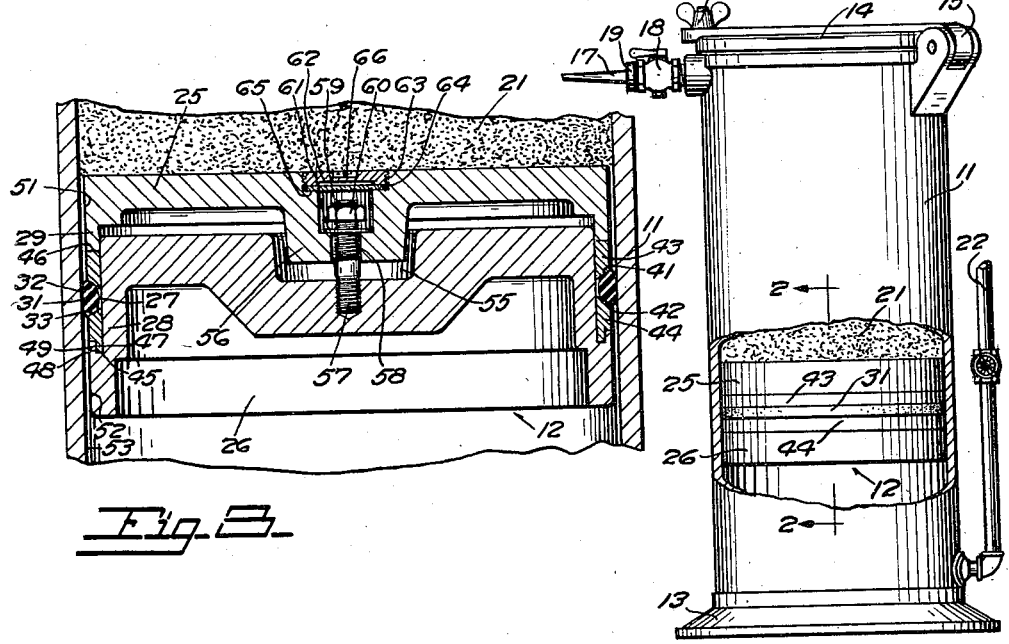
INVENTOR:

Patented June 11, 1935

2,004,618

UNITED STATES PATENT OFFICE 2,004,618

PRESS-HEAD FOR STUFFING MACHINES

Oscar C. Schmidt, Cincinnati, Ohio, assignor to The Cincinnati Butchers' Supply Company, Cincinnati, Ohio, a corporation of Ohio Application July 29, 1933, Serial No. 682,878

1 Claim. (Cl. 309—36)

My invention relates to press-heads for stuffing mechanism employable, for instance, in stuffing sausage casings and in packaging sausage meat and other chopped or cut meat products.

My invention relates principally to novel means for providing close union between the press-head and the wall of the cylinder for preventing leakage past the press-head while preventing undue resistance to movement of the press-head in working direction, and providing ready release of pressure against the wall of the cylinder for return of the press-head to normal position.

In mechanism of the character to which my invention relates, a press-head is employed to cause pressure upon the meat products, hereinafter referred to also as plastic material, in the cylinder, in order to force the plastic material through a suitable nozzle or nozzles or other discharge devices for being fed into sausage casings or other containers. The plastic material is placed in the cylinder at one side of the press-head, and pressure is exerted in the cylinder upon the other side of the press-head, this pressure being caused by a fluid such as air or water admitted into the cylinder at said other side of the press-head. The press-head has an up and down movement in the upright cylinder.

It is desirable that sufficient fluid pressure be directed against the press-head to cause exuding of substantially all of the plastic material in the cylinder at each working stroke of the press-head, and that none of the fluid under pressure shall leak past the press-head into the plastic material, to form detrimental fluid or air pockets in the plastic material or in the sausage casings or to cause bursting of the sausage casings or to act detrimentally on the plastic material. It is also desirable that the press-head return readily to normal position after its working stroke upon release of the fluid pressure under the press-head.

I have provided my improved and novel press-head for bringing about these desiderata.

My invention consists in dividing a press-head into sections having axial movements between them, and having a yieldable packing circumferentially thereabout arranged to be moved bodily in radial directions toward and from the wall of said cylinder, for providing respectively ample pressure contact with said wall during the working stroke of the press-head and for relief of such contact during the return stroke of the press-head.

My invention consists further in providing a resilient band about the outer periphery of a reduced portion of the press-head and coacting parts therefor on the press-head arranged to be forced under the resilient band for moving the latter outwardly in radial directions into intimate contact with the wall of the cylinder; and, further, in providing a resilient band located in an outer annularly grooved press-head between coacting end walls therefor, the said end walls and the corresponding ends of the resilient band including inclined faces for movement under the band for spreading the band radially for pressure contact with the wall of the cylinder, during the working stroke of the press-head, and for recession between said end walls to produce relief of pressure on the resilient band for relief of such pressure during return stroke of the press-head.

The invention will be further readily understood from the following description and claims, and from the drawing, in which latter:

Fig. 1 is a side elevation of an exemplifying stuffing machine embodying my invention, the stuffing machine being partly broken away for better illustration of parts.

Fig. 2 is an axial vertical section of my improved device, taken in the plane of the line 2—2 of Fig. 1, and showing the press-head in extended relation; and, Fig. 3 is a similar view showing the press-head in compressed relation.

A cylinder 11 has the press-head 12 therein. The cylinder is closed at one end by the base 13, and at its other end by a cover 14, hinged to the cylinder by a hinge 15, and clamped to the cylinder by a clamp 16.

One or more nozzles 17 communicate with the space in the cylinder above the press-head, preferably close to the cover 14. Communication between each of the nozzles and the inside of the cylinder is controlled by a suitable valve 18.

The nozzle may receive the sausage casings thereover, into which the nozzle discharges the sausage meat. The nozzles are removable, as by unclamping a suitable coupling 19 securing the same to the valve. Other delivery spouts and pipes may be substituted for the nozzles.

The body 21 of plastic material, or meat dough, is placed at one side of the press-head, for instance, above the same, and fluid pressure is supplied at the other side of the press-head, as under the press-head, in suitable manner, as through a suitable valve in a pipe 22, which communicates with the space under the press-head, preferably at the base. The pressure acts against the lower face of the press-head for raising the press-head and exerting pressure upon the body of plastic material thereabove for causing exuding of plastic material through the valve or valves.

The pressure required under the press-head depends in great measure upon the consistency of the meat dough or plastic material. The pressure required is at times very great.

I have provided novel means for confining such pressure and preventing leakage thereof past the press-head, and preventing leakage of plastic material and the juices or liquid therein past the press-head, while permitting proper movement of the press-head in working direction and proper return of the press-head to normal position.

My improved press-head comprises an upper section 25 and a lower section 26. One of these sections, shown as the section 26, is provided with an annular rabbet 27 for forming a reduced cylinder 28, which is the inner wall of the rabbet. The other section of the press-head is provided with an annular flange 29, the inner face of which is cylindrical and arranged to be telescopingly received about the outer periphery of the reduced cylinder, forming an outer annular peripheral groove in said press-head.

A yieldable band 31 is received about the reduced cylinder. This is preferably an elastic band, of rubber or rubber composition. It is provided with inclined ends 32, 33, which are inclined inwardly toward each other for forming under cut end walls for said band. The outer periphery of this band is preferably annularly bulged toward its middle, as shown at 34 for forming the middle portion of this band thicker than the end portions thereof, which are tapered toward their ends. The respective ends of the outer end faces of this band slant inwardly, as exemplified at 35, 36.

Sloping end walls 41, 42, which slope outwardly away from each other, coact with the reversely sloping end walls 32, 33 of the band 31. The end walls 41, 42 are shown on end bands 43, 44, also located in the rabbet 27, at the respective ends of the intermediate band 31. These end bands are also preferably resilient, as by being constructed of rubber or rubber composition, or they may be of hard substance, for instance metal, and even if of rubber or rubber composition they are preferably of harder substance and less resilient than the intermediate band 31, so that the spreading movement obtained may be produced in the intermediate band 31 and be the result of coaction between the coacting inclined ends of the end bands and the intermediate band.

These bands are located in the rabbet between the bottom 45 of the rabbet and the inner end 46 of the annular flange 29. If desired, the end band 44 may have an inner annular tongue 47 received in an annular groove 48 inside the annular tongue 49 of the outer wall of the lower section of the press-head. The bands are preferably annularly closed bands to prevent leakage past them.

The upper and lower press-head sections have outer cylindrical peripheries 51, 52, which are concentric with and normally spaced slightly from the inner periphery 53 of the cylinder.

The lower section is provided with a cavity 55, in which a hub 56 of the upper section is received.

In order to limit separating movement between the sections, I provide a stud 57, which is threaded into the lower section and passes through a bearing 58 in the hub 56. There is a recess 59 in the upper section, into which the upper threaded end of the stud extends. A nut 60 is adjustably threaded over the upper end of the stud in said recess, there being a washer 61 between the nut and the lower wall of the recess.

Adjustment of the nut lengthwise of the stud adjusts the extent of the separating movement between the sections, as will be observed by comparing Figs. 2 and 3, the upper end of the stud and the nut having reciprocating movement in the recess.

The recess is closed by a plug 62 threaded into the upper threaded end 63 of the wall of the recess 59. A gasket 64 is clamped by the plug against an annular shoulder 65 formed in the recess. The plug has a square walled socket 66 in its upper face, wherein a square ended wrench may be placed for turning the same. This plug protects the recess and the stud and nut from the plastic material.

The lower section of the press-head is shown of greater weight than the upper section, so as to insure a dropping of the lower section with relation to the upper section.

In operation, plastic material is placed in the cylinder above the press-head, and the cover 14 is closed and clamped, the press-head being at the bottom of the cylinder. Fluid pressure is supplied under the press-head, controlled by a suitable valve in the pipe 22. The fluid pressure acts against the lower face of the lower section of the press-head.

The weight of the upper section of the press-head and the plastic material thereabove acts on the intermediate band 31, through the upper band 43, resisted by the lower band 44 and the lower section of the press-head, which latter rests on the bottom of the cylinder.

The coacting slanting faces 41, 32 and 42, 33, which are respectively oppositely frusto-conical in form, impart an initial spreading to the band 31, spreading the same bodily, for causing contact of the middle bulged portion of the same with the inner face of the wall of the cylinder, so as to initially seal the spaces above and below the press-head from each other. The outer periphery of this band is normally within the cylindrical projection of the outer periphery of the piston, as will be observed in Fig. 2, which shows the press-head in descending relation.

Fluid pressure is supplied under the press-head through a suitable valve in the pipe 22. This fluid pressure acts against the lower face of the lower section of the press-head, raising the lower section, resisted by the upper section and the weight of the plastic material thereabove, whereby further outward radial pressure is exerted upon the elastic band 31 by the coacting frusto-conical faces mentioned, for still further radially bodily spreading this elastic band for more intimate contact of its bulged middle portion with the inner face of the wall of the cylinder, and preventing the leaking of pressure fluid upwardly past the band 31 or into the press-head, and the passage of plastic material or its juices downwardly past the elastic band 31 and into the press-head.

There is intimate sealing contact between the outer periphery of the band 31 and the inner face of the wall of the cylinder, and between the coacting slanting faces 41, 32 and 42, 33.

The endwise pressure of the sloping faces upon the band 31 tends to move the respective ends of the band radially outward, and at the same time to compress the band in axial direction for producing greater thickness in the band and to move the whole of the closed band radially outward, to intimately fill the radial space between the band and the inner periphery of the cylindrical wall of the cylinder and to space the inner periphery of the band from the outer periphery of the reduced portion 28 of the press-head. (See Fig. 3.)

The construction and arrangement of the parts compel more intimate pressure at the middle portion than at the end portions of the band 31 against the wall of the cylinder.

The cross-sectional form of the band is such, due to the greater thickness in radial directions of its middle portion than of its end portions, that the zone of extreme pressure lengthwise of the press-head against the wall of the cylinder is reduced and the pressure throughout that zone is increased, for preventing leakage past the band, and at the same time avoiding undue friction between the press-head and the cylinder.

The cross-sectional form of the band 31 also prevents the formation of hollows or pockets in the outer peripheral face thereof toward the inner face of the cylinder which would create vacuum spots, hollows or cups which would retard movement of the press-head lengthwise of the cylinder, and prevent proper descent of the cylinder in its return to normal position.

The arresting properties of my improved device are enhanced by forming the end bands 43, 44 of elastic material, preferably of less elasticity than the elasticity of the intermediate band 31, as thereby more intimate contact between said end bands and the walls of the rabbet and the end wall 46 of the flange 29 are insured to prevent leakage past the press-head and into the press-head.

When the packing has been acted on by the fluid pressure on the lower section of the press-head sufficiently to support the upper section of the press-head and the weight of the plastic material thereabove, the press-head will, on the admission of further fluid pressure thereunder, move upwardly, with the sections of the press-head in closer relation and the packing in fully sealed relation, as indicated in Fig. 3. Upward movement of the press-head forces the plastic material through the valve.

When the upward movement of the press-head has been completed, and the pressure valve is manipulated to shut off the supply of pressure, and to open the space in the cylinder under the press-head to the atmosphere, the lower section of the press-head will drop with relation to the upper section thereof to the limit of separation permitted by the adjustment of the nut 60, whereby pressure between the conical or slanting coacting faces of the packing is relieved, for relieving the endwise pressure on the packing and outward lateral pressure of the packing upon the cylinder, permitting the band 31 to contract bodily radially between the end bands, which have moved into further separated relation, as exemplified in Fig. 2, for permitting descent of the press-head in the cylinder to follow the release of pressure under the press-head.

When the press-head has reached the bottom of the cylinder, the cover may be removed for recharging the cylinder and repeating the operation.

Having thus fully described my invention, what I claim as new and desire to secure by Letters Patent, is:

In a press-head, the combination of a closed elastic annular band containing rubber bodily extensible and contractible as a closed annulus in radial directions to change its diameter and having ends whose inner peripheries are inclined inwardly toward each other and outer peripheries tapering toward the respective ends of said closed elastic annular band, said closed elastic annular band further having a cross-sectionally outwardly bulged annular middle portion between said ends and located in an outer annular groove between relatively axially movable press-head sections having guiding means between them extending in axial direction for separating movement and approaching movement between said press-head sections during opposite axial reciprocations of said press-head, said press-head sections provided with limiting means limiting separating movement between said press-head sections, the respective ends of said outer annular groove forming annular shoulders, closed annular elastic bands containing rubber and of less elasticity than said first-named closed elastic annular band and located in said outer annular groove between said respective annular shoulders and the respective ends of said first-named closed elastic annular band, the adjacent ends of said second-named closed annular elastic bands having annular end inclined faces inclined outwardly away from each other and coacting with said first-named inclined ends for movement behind said first-named inclined ends upon approach between said press-head sections and for recession from said last-named position upon recession between said press-head sections.

OSCAR C. SCHMIDT.